US009765713B2

(12) United States Patent
Kou

(10) Patent No.: US 9,765,713 B2
(45) Date of Patent: Sep. 19, 2017

(54) HYDROGEN FUEL ASSIST DEVICE FOR AN INTERNAL COMBUSTION ENGINE SYSTEM

(71) Applicant: Huan-Hsin Kou, Taipei (TW)

(72) Inventor: Huan-Hsin Kou, Taipei (TW)

( * ) Notice: Subject to any disclaimer, the term of this patent is extended or adjusted under 35 U.S.C. 154(b) by 106 days.

(21) Appl. No.: 14/329,193

(22) Filed: Jul. 11, 2014

(65) Prior Publication Data

US 2016/0010575 A1 Jan. 14, 2016

(51) Int. Cl.
| | | |
|---|---|---|
| *F02M 21/02* | (2006.01) | |
| *F02M 25/00* | (2006.01) | |
| *F02D 41/00* | (2006.01) | |
| *F02M 25/12* | (2006.01) | |
| *F02D 41/30* | (2006.01) | |
| *F02D 19/06* | (2006.01) | |
| *F02D 19/08* | (2006.01) | |
| *F02D 31/00* | (2006.01) | |

(52) U.S. Cl.
CPC ..... *F02D 41/0027* (2013.01); *F02D 19/0644* (2013.01); *F02D 19/0671* (2013.01); *F02D 19/081* (2013.01); *F02D 41/3082* (2013.01); *F02M 25/12* (2013.01); *F02D 31/009* (2013.01); *Y02T 10/36* (2013.01)

(58) Field of Classification Search
CPC ......... F02B 43/00; F02B 43/10; F02M 27/02; F02M 25/12; F02M 13/08; F02M 21/02; F02D 41/0027; F02D 19/0644; F02D 19/0671; F02D 19/081; F02D 41/3082; F02D 31/009

USPC .............................. 123/3, 1 A, 541, 557, 525
See application file for complete search history.

(56) References Cited

U.S. PATENT DOCUMENTS

| | | | | |
|---|---|---|---|---|
| 5,178,118 | A * | 1/1993 | Nakamats | F02M 21/0221 123/3 |
| 6,336,430 | B2 * | 1/2002 | de Souza | C25B 9/06 123/3 |
| 7,536,981 | B2 * | 5/2009 | Sadikay | F02B 43/10 123/1 A |
| 2007/0111058 | A1 * | 5/2007 | Yoshida | H01M 8/04223 429/408 |
| 2013/0101910 | A1 * | 4/2013 | Barton | H01M 8/0606 429/416 |

FOREIGN PATENT DOCUMENTS

JP 2009-257175 A 11/2009

* cited by examiner

*Primary Examiner* — Syed O Hasan
(74) *Attorney, Agent, or Firm* — Blank Rome LLP

(57) ABSTRACT

A hydrogen fuel assist device for an internal combustion engine includes: a hydrogen gas generator for generating hydrogen gas; a fluid pump capable of pumping the hydrogen gas into a combustion chamber of the internal combustion engine through an air throttle valve, which is connected to the combustion chamber, at varying flow rates; and a pump controller for controlling a rotational speed of the fluid pump in response to opening degree of a fuel throttle valve connected to the combustion chamber so as to adjust the flow rate of the hydrogen gas to be supplied into the combustion chamber during operation of the internal combustion engine.

9 Claims, 3 Drawing Sheets

HYDROGEN FUEL ASSIST DEVICE FOR AN INTERNAL COMBUSTION ENGINE SYSTEM

BACKGROUND OF THE INVENTION

1. Field of the Invention

The invention relates to internal combustion engines, and more particularly to hydrogen fuel additives for improving engine performance.

2. Description of the Related Art

Since hydrogen has very fast combustion velocity, hydrogen may be beneficial as a secondary fuel added to a primary fuel, such as gasoline or diesel fuel, for use in internal combustion engines. For example, hydrogen, when mixed with an air-fuel mixture of a primary fuel of an engine in a vehicle, may elevate the performance of the internal combustion engine by increasing the mileage and enhancing the fuel economy of the vehicle with respect to the primary fuel. Additionally, hydrogen may also increase the horsepower output of the internal combustion engine. Further, since hydrogen flame has a very short quenching distance of about 0.64 mm, hydrogen may reduce the amount of undesirable emissions, such as hydrocarbon (HC) and carbon oxide (CO), from the engine.

Some electrolysis systems have been developed to produce hydrogen and oxygen specifically for use in internal combustion engines. Typically, these systems use electrolysis cells to decompose water into hydrogen and oxygen and then draw the hydrogen and oxygen for combination with the primary air-fuel mixture of the internal combustion engine. However, these systems may have inherent safety issues. For example, it is difficult to separate the hydrogen and oxygen produced by such electrolysis cells; consequently, the hydrogen and oxygen gases are directed from the cells to the internal combustion engine in a combined state, which may be relatively explosive.

Therefore, improvements may still be made to the above techniques.

SUMMARY OF THE INVENTION

Therefore, an object of the present invention is to provide a hydrogen fuel assist device for an internal combustion engine system that can overcome the aforesaid drawbacks of the prior art.

According to the present invention, there is provided a hydrogen fuel assist device for an internal combustion engine system. The internal combustion engine system includes an internal combustion engine, which has a combustion chamber, and a fuel throttle valve and an air throttle valve which are connected with the combustion chamber. The hydrogen fuel assist device of the present invention comprises:

a hydrogen gas generator for generating hydrogen gas;

a fluid pump to be connected between the hydrogen gas generator and the air throttle valve, the fluid pump being capable of pumping the hydrogen gas generated by the hydrogen gas generator into the combustion chamber through the air throttle valve at varying flow rates; and a pump controller electrically connected to the fluid pump, the pump controller being operable to control a rotational speed of the fluid pump in response to opening degree of the fuel throttle valve so as to adjust the flow rate of the hydrogen gas to be supplied into the combustion chamber during operation of the internal combustion engine.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
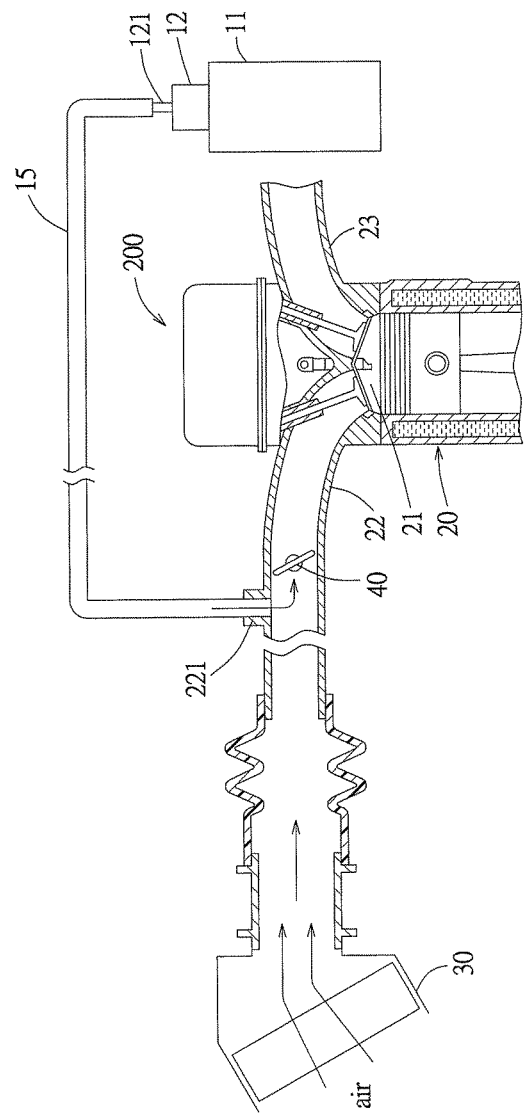
FIG. 1 is a fragmentary schematic view showing the preferred embodiment of a hydrogen fuel assist device for an internal combustion engine system according to the present invention without a throttle valve opening degree sensor and a pump controller.
Figure 2:
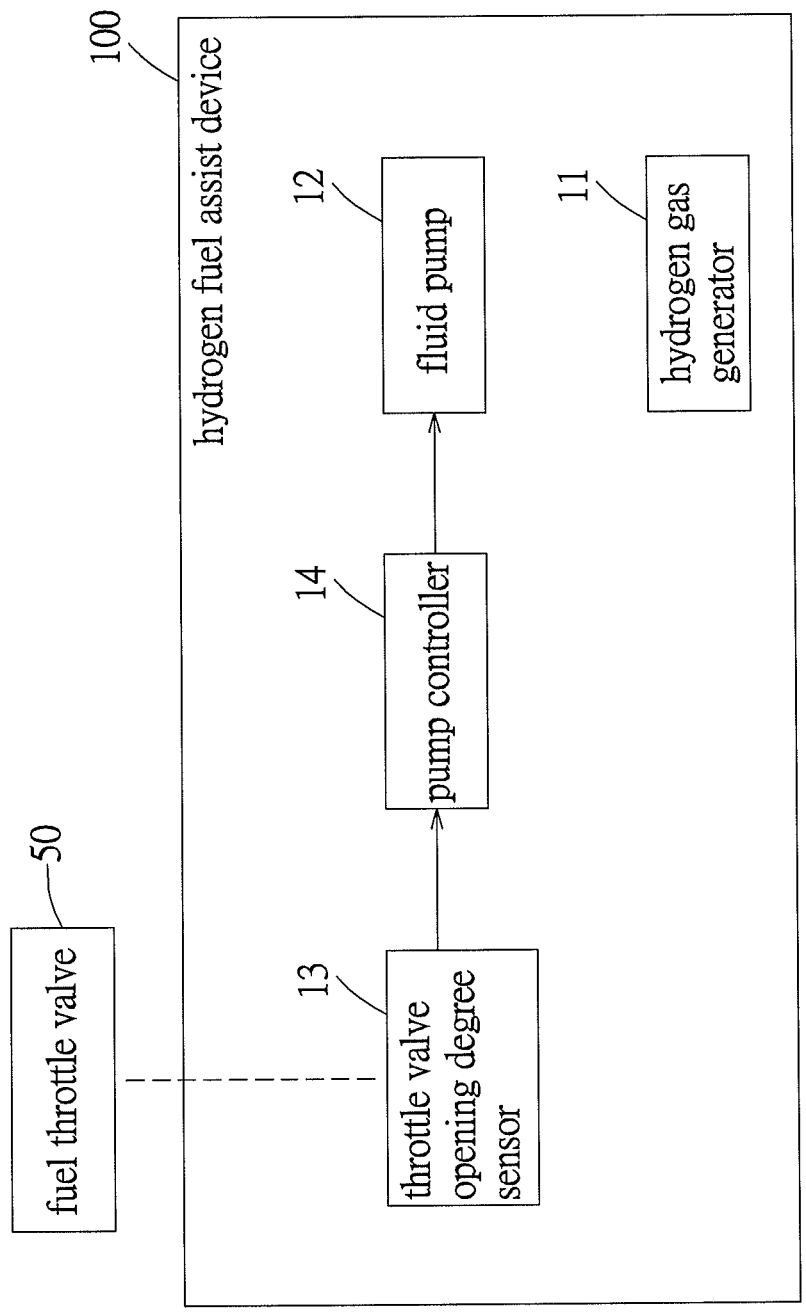
FIG. 2 is a block diagram illustrating the components of the preferred embodiment.

Referring to FIGS. 1 and 2, the preferred embodiment of a hydrogen fuel assist device 100 according to the present invention is adapted for use with an internal combustion engine system 200. The internal combustion engine system 200 includes: an internal combustion engine 20, such as a vehicle engine, a marine engine or the like, that has a combustion chamber 21, an intake passage 22 fluidly interconnecting the combustion chamber 21 and an air filter 30, and an exhaust passage 23 fluidly connected to the combustion chamber 21; an air throttle valve 40 that is disposed in the intake passage 22; and a fuel throttle valve 50 (not shown in FIG. 1) connected to the combustion chamber 21 for regulating the quantity of primary fuel supplied into the combustion chamber 21. In this embodiment, the primary fuel may be gasoline fuel or diesel fuel.

The hydrogen fuel assist device 100 includes a hydrogen gas generator 11, a fluid pump 12, a throttle valve opening degree sensor 13 and a pump controller 14.

The hydrogen gas generator 11 is operative to generate hydrogen gas, which serves as secondary fuel for the internal combustion engine system 200, through a reaction of a hydro-reactive metal material with an aqueous solution. In this embodiment, the hydro-reactive metal material may be one of magnesium, aluminum and alloys thereof. The aqueous solution may contain water, an alcohol, such as methanol and ethanol, and an acid, such as hydrochloric acid. Preferably, the aqueous solution consists of 20~60 wt % of the alcohol, 3~9 wt % of the acid, and sufficient water. As one example, the hydro-reactive metal material is a porous body of magnesium, and the aqueous solution consists of 51 wt % of water, 40 wt % of methanol, and 9 wt % of hydrochloric acid.

The fluid pump 12 is to be connected between the hydrogen gas generator 11 and the air throttle valve 40. In this embodiment, as shown in FIG. 1, the fluid pump 2 is directly connected with the hydrogen gas generator 11 so as to receive the hydrogen gas generated thereby, and has an outlet 121 fluidly connected to the intake passage 22 through a connection tube 15 and a tube fitting 221, which is disposed close to the air throttle valve 40. The fluid pump 12 is capable of pumping, at varying flow rates, the hydrogen gas generated by the hydrogen gas generator 11 into the combustion chamber 21 through the outlet 121, the connection tube 15, the tube fitting 221, the air throttle valve 40 and the intake passage 22.

The throttle valve opening degree sensor 13 is used to sense the opening degree of the fuel throttle valve 50 so as to generate a sensing output indicating the opening degree of the fuel throttle valve 50. It should be noted that, when the hydrogen fuel assist device 100 is used with a vehicle engine, the throttle valve opening degree sensor 13 may be incorporated into a vehicle testing system, such as an on-board diagnostic (OBD) system. Since the feature of this invention does not reside in the configuration of the throttle valve opening degree sensor 13, which is known to those skilled in the art, details of the same are omitted herein for the sake of brevity.

The pump controller 14 is electrically connected to the fluid pump 12 and the throttle valve opening degree sensor 13, and receives the sensing output from the throttle valve opening degree 13. The pump controller 14 is operable to control a rotational speed of the fluid pump 12 in response to the opening degree of the fuel throttle valve 50 so as to adjust the flow rate of the hydrogen gas to be supplied into the combustion chamber 21 during operation of the internal combustion engine 20. In this embodiment, the pump controller 14 generates a pump control signal based on the sensing output, and outputs the pump control signal to the fluid pump 12 so as to control the rotational speed of the fluid pump 12 to be within a range between a maximum rotational speed at which the hydrogen gas is supplied from the hydrogen gas generator 11 into the combustion chamber 21 at a maximum flow rate associated with the cylinder volume of the internal combustion engine 20, and a minimum rotational speed lower than the maximum rotational speed. As one example, for a 50 cc engine, the maximum flow rate of the hydrogen gas, which is supplied by the fluid pump 21 operating at the maximum rotational speed, is about 5000 cc/min.

Preferably, when the opening degree of the fuel throttle valve 50 is zero, the rotational speed of the fluid pump 12 is controlled by the pump control signal from the pump controller 14 to be an initial rotational speed between the maximum and minimum rotational speeds. When the opening degree of the fuel throttle valve 50 varies from zero to an opening degree threshold value, the rotational speed of the fluid pump 12 is controlled by the pump control signal from the pump controller 14 to increase from the initial rotational speed to the maximum rotational speed. When the opening degree of the fuel throttle valve 50 varies from the opening degree threshold value to 100%, the rotational speed of the fluid pump 12 is controlled by the pump control signal from the pump controller 14 to decrease from the maximum rotational speed to the minimum rotational speed. As one example, the initial rotational speed may be 60% of the maximum rotational speed, the minimum rotational speed may be 10% of the maximum rotational speed, and the opening degree threshold value may be 40%.

Figure 3:
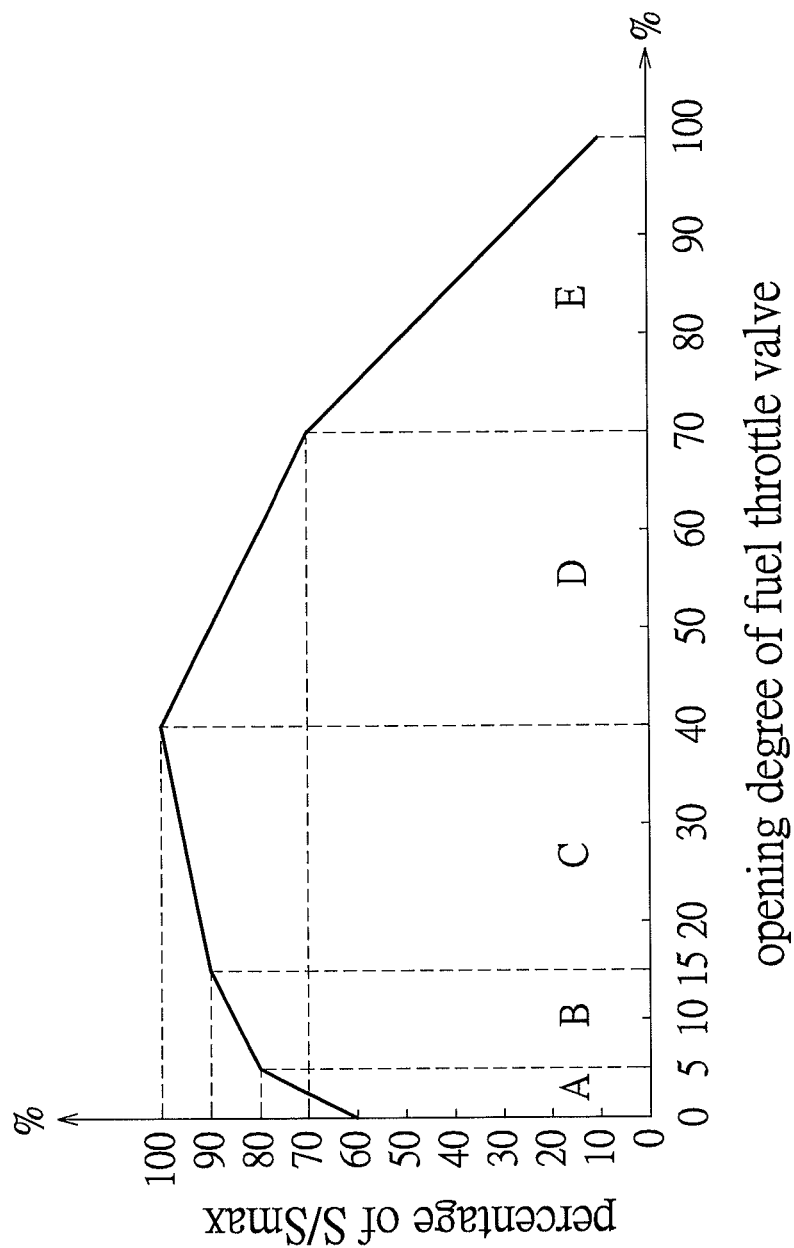
FIG. 3 is a plot illustrating the relationships between a rotational speed of a fluid pump and opening degree of a fuel throttle valve in an exemplary embodiment.

In one exemplary embodiment, referring to FIG. 3, the fluid pump 12 is controlled by the pump controller 14 to be operable among first to fifth states, indicated respectively by A, B, C, D and E, during operation of the internal combustion engine 20. When the opening degree (x) of the fuel throttle valve 50 is not smaller than 0 and not greater than 5%, i.e., 0≤x≤5%, the fluid pump 12 is in the first state (A), where the relationship between the opening degree (x) of the fuel throttle valve 50 and the percentage of the rotational speed (S) of the fluid pump 12 to the maximum rotational speed (Smax) can be obtained by the following function (1):

$$f(x)=60\%+4x \tag{1}$$

Here, f(x) represents the percentage of $$\frac{S}{S\max}.$$

When 5%<x≤15%, the fluid pump 12 is in the second state (B), where the percentage of $$\frac{S}{S\max}$$

can be expressed by the following function (2):

$$f(x)=80\%+(x-5\%) \tag{2}$$

When 15%<x≤40%, the fluid pump 12 is in the third state (C), where the percentage of $$\frac{S}{S\max}$$

can be expressed by the following function (3):

$$f(x) = 90\% + \frac{2}{5}(x - 15\%). \tag{3}$$

When 40%<x≤70%, the fluid pump 12 is in the fourth state (D), where the percentage of $$\frac{S}{S\max}$$

can be expressed by the following function (4):

$$f(x)=100\%-(x-40\%) \tag{4}.$$

When 70%<x≤100%, the fluid pump 12 is in the fifth state (E), where the percentage of $$\frac{S}{S\max}$$

can be expressed by the following function (5):

$$f(x)=70\%-2(x-70\%)$$

According to the above exemplary embodiment, the following is expected to be achievable: fuel exhaustion of the internal combustion engine 20 may be saved by about 3%~30% under the same horsepower output condition; the horsepower output of the internal combustion engine 20 may be increased by about 10%~20% under the same fuel exhaustion condition; and service life of lubricating oil used in the internal combustion engine 20 may be prolonged as a result of the reduced amount of undesirable emissions from the internal combustion engine 20.

In sum, since the pump controller 14 controls the flow amount of the hydrogen gas into the combustion chamber 21 in response to the opening degree of the fuel throttle valve 50, the hydrogen fuel assist device 100 of this invention may effectively increase the performance of the internal combustion engine 20 and reduce the amount of undesirable emissions. It should be noted that, when the opening degree of the fuel throttle valve 50 is greater than 40%, the flow amount of the hydrogen gas supplied into the internal combustion engine 20 decreases as compared to when the opening degree is below 40%, thereby ensuring safety in operation of the internal combustion engine 20 at relatively high horsepower output. Moreover, in case that the hydrogen fuel assist device 100 of this invention is applied to a vehicle engine, information related to the opening degree of the fuel throttle valve 50 can be obtained from a vehicle OBD system, such that the throttle valve opening degree sensor 13 can be omitted. In addition, since the hydrogen fuel assist device 100 of this invention has relatively simple configuration, it may be easily installed to currently existing internal combustion engine systems without changing their original designs, thereby providing high practicability.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A hydrogen fuel assist device for an internal combustion engine system, the internal combustion engine system including an internal combustion engine, which has a combustion chamber, and a fuel throttle valve and an air throttle valve which are connected to the combustion chamber, said hydrogen fuel assist device comprising: a hydrogen gas generator for generating hydrogen gas with a gas outlet; a fluid pump connected between said gas outlet and the air throttle valve, said fluid pump directly pumping the generated hydrogen gas from said hydrogen gas generator directly into the combustion chamber through the air throttle valve at varying flow rates; and a pump controller electrically connected to said fluid pump, said pump controller being operable to control a rotational speed of said fluid pump based solely on opening degree of the fuel throttle valve so as to adjust the flow rate of the generated hydrogen gas to be supplied into the combustion chamber during operation of the internal combustion engine.

2. The hydrogen fuel assist device as claimed in claim 1, wherein said hydrogen gas generator generates the hydrogen gas through a reaction of a hydro-reactive metal material with an aqueous solution.

3. The hydrogen fuel assist device as claimed in claim 2, wherein said hydro-reactive metal material is one of magnesium, aluminum and alloys thereof, and said aqueous solution contains water, an alcohol and an acid.

4. The hydrogen fuel assist device as claimed in claim 1, further comprising a throttle valve opening degree sensor coupled to said pump controller, said throttle valve opening degree sensor being used to sense the opening degree of the fuel throttle valve so as to generate a sensing output indicating the opening degree of the fuel throttle valve, said pump controller controlling the rotational speed of said fluid pump based on the sensing output from said throttle valve opening degree sensor.

5. The hydrogen fuel assist device as claimed in claim 1, wherein the rotational speed of said fluid pump as controlled by said pump controller ranges between a maximum rotational speed at which the hydrogen gas is supplied from said hydrogen gas generator into the combustion chamber at a maximum flow rate associated with the cylinder volume of the internal combustion engine, and a minimum rotational speed lower than the maximum rotational speed.

6. The hydrogen fuel assist device as claimed in claim 5, wherein: when the opening degree of the fuel throttle valve is zero, the rotational speed of said fluid pump is controlled by said pump controller to be an initial rotational speed between the maximum and minimum rotational speeds; when the opening degree of the fuel throttle valve increases from zero to an opening degree threshold value, the rotational speed of said fluid pump is controlled by said pump controller to increase from the initial rotational speed to the maximum rotational speed; and when the opening degree of the fuel throttle valve increases from the opening degree threshold value to 100%, the rotational speed of said fluid pump is controlled by said pump controller to decrease from the maximum rotational speed to the minimum rotational speed.

7. The hydrogen fuel assist device as claimed in claim 6, wherein the initial rotational speed is 60% of the maximum rotational speed, the minimum rotational speed is 10% of the maximum rotational speed, and the opening degree threshold value is 40% of the maximum rotational speed.

8. The hydrogen fuel assist device as claimed in claim 7, wherein the relationships between the opening degree of the fuel throttle valve, and the percentage of the rotational speed of said fluid pump to the maximum rotational speed are defined by said pump controller in accordance with the following functions:

$$\text{when } 0 \leq x \leq 5\%, f(x) = 60\% + 4x;$$
$$\text{when } 5\% < x \leq 15\%, f(x) = 80\% + (x - 5\%);$$
$$\text{when } 15\% < x \leq 40\%, f(x) = 90\% + 2/5(x - 15\%);$$
$$\text{when } 40\% < x \leq 70\%, f(x) = 100\% - (x - 40\%); \text{ and}$$
$$\text{when } 70\% < x \leq 100\%, f(x) = 70\% - 2(x - 70\%);$$

where x is the opening degree of the fuel throttle valve, and f(x) is the percentage of the rotational speed of said fluid pump to the maximum rotational speed.

9. The hydrogen fuel assist device as claimed in claim 1, wherein the flow rate of the generated hydrogen gas to be supplied into the combustion chamber during operation of the internal combustion engine decreases when the opening degree of the fuel throttle value is greater than 40% as compared to when the opening degree of the fuel throttle value is less than 40%.

* * * * *